US000001916H

United States Statutory Invention Registration [19]

[11] Reg. Number: H1,916

Hollander

[45] Published: Nov. 7, 2000

[54] HOSTILE WEAPON LOCATOR SYSTEM

[75] Inventor: Samuel Hollander, Gaithersburg, Md.

[73] Assignee: The United States of America as represented by the Secretary of the Navy, Washington, D.C.

[21] Appl. No.: 08/909,439

[22] Filed: Jun. 27, 1997

[51] Int. Cl.[7] ..... G01S 3/80

[52] U.S. Cl. ..... 367/118; 367/127; 367/128

*Primary Examiner*—Daniel T. Pihulic

*Attorney, Agent, or Firm*—Thomas E. McDonnell

[57] ABSTRACT

A system is disclosed for determining the location from which a sound blast having an identifiable audio signature originates. The system is particularly suited for determining the location of the muzzle blast from which a projectile, such as a bomb, is being launched by an enemy. The system comprises a plurality of elevated or airborne sensors whose position is accurately determined and which supply information to a land base station that performs the trigometric operations to ascertain the location of the enemy weapon.

7 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HOSTILE WEAPON LOCATOR SYSTEM

BACKGROUND OF THE INVENTION 1.0 Field of the Invention

The present invention relates to a field of military activities involving the determination and coordination of target locations and, more particularly, to a system particularly suited to determine the location of the muzzle from which an explosive projectile has been launched. Specifically, the present invention comprises an array of elevated or airborne sensors wherein all sensors are on a direct unencumbered path to a target of interest not burdened with the detection of reflected sound signals so that the target of interest may be accurately located.

2.0 Description of the Prior Art

Numerous techniques exist for detecting hostile weapon firing using aircraft, unmanned remotely piloted vehicles, human intelligence, and various ground based sensing systems. A system that uses human intelligence in cooperation with a rifle-target locator receiving global positioning system (GPS) information is capable of precisely determining the location coordinates of the target. One such system being described in U.S. Pat. No. 4,949,089, is herein incorporated by reference.

A system which detects and determines the location of muzzle blast sound generated by gun fire is also known and one such system is described in U.S. Pat. No. 2,962,696 ('696), which is herein incorporated by reference. The '696 patent utilizes cosine law microphones that serve as a sound wave energy detector for locating the placement of the gun from which the blast emanates. The system of the '696 patent suffers accuracy degradations because it is a land-base system and is subjected to the detection of unreliable reflections or echoes from the initial source of the sound. It is desired that a system be provided for detecting the location of a gun blast without encountering gun blast multi-path reflection or echo signals.

With the exception of a low altitude pilot aircraft visually spotting the weapon of an enemy and taking immediate action to destroy the weapon, prior art detection systems suffer some accuracy degradation for directing fire control to insure a proper response to a distant or concealed weapon of an enemy. Apart from the risk of detection by aircraft surveillance, detection may generally be avoided when the enemy employs night-time cover, weather conditions, camouflage concealment or other techniques.

Many types of acoustic ranging systems have been employed but most of these consist of ground-based sensing arrays. The ground-based sensing arrays must for the most part be deployed in friendly territory, and, as mentioned with reference to the '696 patent, are limited by spurious multi-path reflection signals. It is desired that a hostile weapon locator system be provided that does not suffer from the accuracy degradations encountered by ground-based sensing arrays. It is further desired that a hostile locating weapon system be provided that is of a low cost and yet sufficiently accurate to permit effective automated retaliatory strikes.

OBJECTS OF THE INVENTION

Accordingly, it is a primary object of the present invention to provide for a hostile weapon locating system, through the use of elevated or airborne acoustic sensors, so as to eliminate the corrupting influence of multi-path reflections or echo sound-wave signals that are inherent in ground-based acoustic sensing systems.

Further, it is an object of the present invention to provide elevated or airborne sensors that have means to accommodate precision metrology, based on global positioning system or laser range finding systems, to accurately record the instantaneous position of the sensor at the time of receipt of an acoustic signal.

Furthermore, it is an object of the present invention to provide a locating system that permits detection and accurate determination of the location of a hostile weapon firing.

SUMMARY OF THE INVENTION

The present invention is directed to a hostile weapon locating system that employs a plurality of elevated or airborne acoustic sensors and support electronics that cooperate with a ground-based range locating system so as to precisely determine the location from which the hostile firing is being initiated.

The system comprises an array of stationary or mobile sensor platforms each containing an acoustic sensor device, acoustic discrimination capability, precise timing, local atmosphere measurement instrumentation, instantaneous position determination, and a radio transmitter. Each sensor platform has the means to accurately determine its three axis coordinates, within a local area coordinate reference system, at the instant of receipt of a recognized enemy weapon firing detection. Platform coordinates and time, at the instant of detection, together with acoustic waveform characteristics and current atmosphere data are telemetered to a ground control station. This master control station receives and processes transmissions from multiple receiving platforms to validate the occurrence of a known enemy weapon firing, and performs rapid computations to determine the precise location of the initial blast. These computations involve acoustic path solutions corrected for local topography and atmospheric conditions, and are intended to be of sufficient accuracy to command an immediate automated retaliatory strike.

BRIEF DESCRIPTION OF THE DRAWINGS

These and other objects, features and advantages of the invention, as well as the invention itself, become better understood by reference to the following detailed description when considered in conjunction with the accompanying drawings wherein like reference numbers designate identical or corresponding parts throughout and wherein.

DETAILED DESCRIPTION OF THE PREFERRED EMBODIMENTS

Before discussing the drawings, it should be noted that the present invention provides a hostile weapon locator system which consists of a set of mobile or stationary elevated acoustic sensor platforms. These platforms may be suspended from tethered or free-floating balloons, attached to manned or remotely piloted aircraft, deployed from extensible masts on ground vehicles, or affixed to towers or other such suitable ground placements. All sensor platforms must have clear line-of-sight view to the target, to insure that the first signal detected by the sensors is from the initial blast and not from reflections or echoes of that blast.

Figure 1:
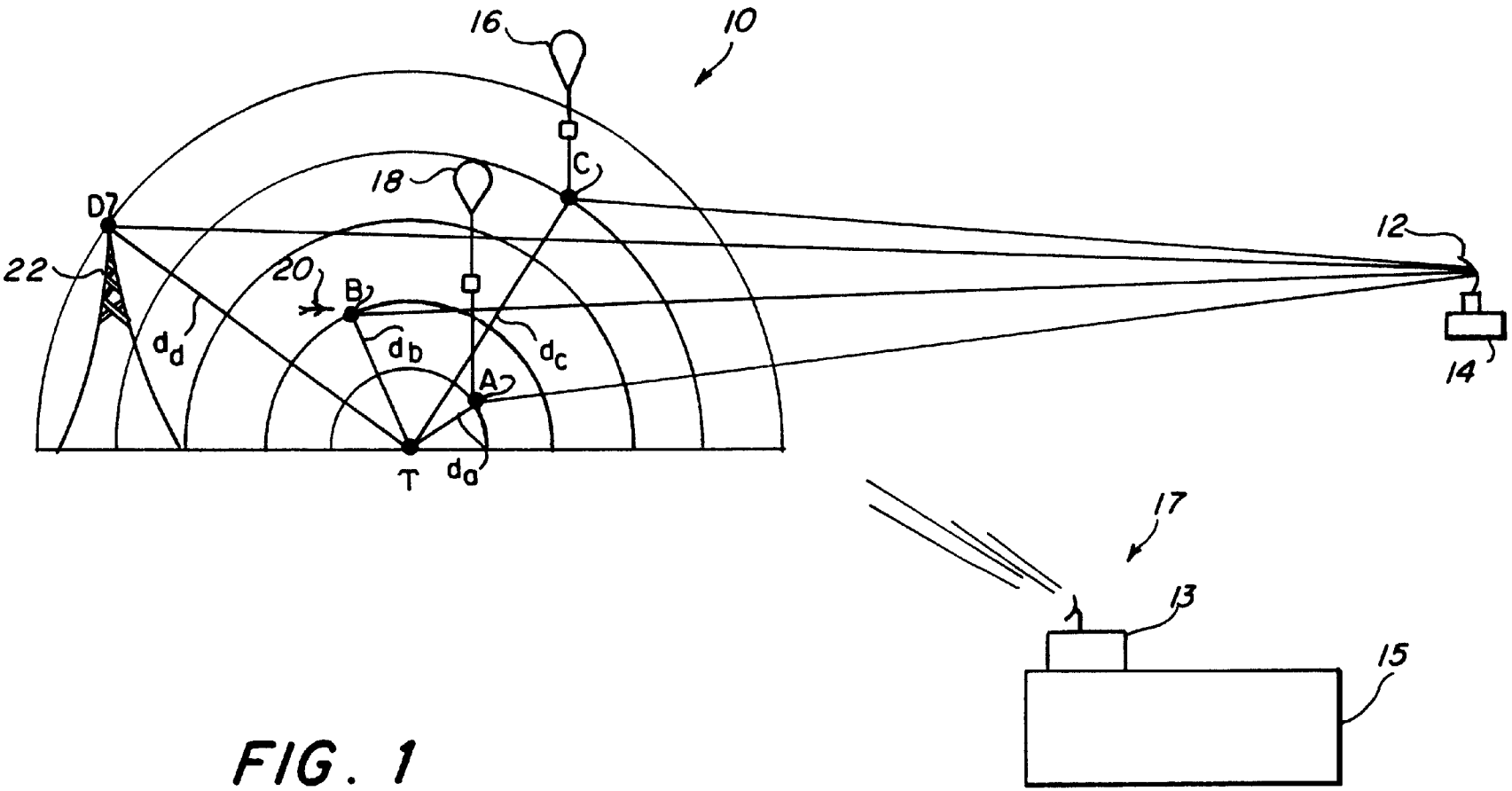
FIG. 1 is a pictorial representation of the utilization of the hostile weapons locator system of the present invention.

Referring now to the drawings, FIG. 1 is a simplified pictorial representation of such a system 10 for determining, through acoustic means, the location of an enemy gun target T through the characteristic signature of its initial muzzle blast. FIG. 1 depicts four sensor platforms, A, B, C, and D positioned from target T by distances $d_A$, $d_B$, $d_C$, and $d_D$, to be determined. The sensor platforms that are shown are; a free-flying balloon 16, a tethered balloon 18, a piloted or radio controlled flying vehicle 20 and a fixed tower 22. Other similar means for providing elevated acoustic sensors may be used, although not shown. The system 10 comprises means for determining the position of each sensor at the instant it receives a target detection. This means may consist of a global positioning system receiver located directly on the sensor platform, or alternatively, a laser retroreflector which cooperates with a laser emitter 12 as part of a laser range finding system 14.

The global positioning system, to be described hereinafter, and the laser range finding system 14 are known in the art and each is capable of precisely determining the three dimensional spatial coordinates of a sensor platform, relative to a local coordinate grid, at the instant of detection, by the acoustic sensors of the present invention, of a target signal of interest. Upon receipt of an acoustic detection, the platform transmits by radio frequency transmitter to a central command station 17 the acoustic characteristics of the received signal together with time of receipt, atmospheric updates, and platform coordinates. The central command station 17 consists of a telemetry receiver 13, a central command processor 15, and associated support equipment. The central command processor 15 processes this data along with detailed meteorology models including the local atmosphere and topography to solve the location of the target of interest T.

In general, the system 10 determines the location of the target of interest T, based upon differences of arrival times between the audio signals received by the sensors. Precise timing and instantaneous sensor positions are provided preferably by the global positioning system (GPS) known in the art. A primary feature of the operation of the system 10 is that it employs sensor arrays whereby all sensors are in a direct unencumbered path to the target of interest T. As will be further described, the location of the target of interest, T, is calculated by the intersection of computed audio path links to each of the sensors that detects the blast emanating from the location of the target of interest T. More particularly, the system performance of the present invention is not degraded by reflection or echo signals of the initial sound (gun blast), as these reflections are ignored by the system. It is extremely desired that the audio waveforms received by the sensors be filtered and compared to audio characteristics of enemy weapons that are sufficiently different from characteristics of friendly weapons or other non-reactionable noise disturbances. The system 10 employs an array of sensor platforms each of which consists of a sensor payload 24 which may be further described with reference to FIG. 2 comprising a plurality of elements that are listed in Table 1.

TABLE 1

| REFERENCE NO. | ELEMENT |
|---|---|
| 26 | MICROPHONE |
| 28 | BANDPASS FILTER |
| 30 | PREAMPLIFIER |
| 34 | LEVEL DETECTOR |
| 36 | SOURCE DETECTION AND CLASSIFICATION MEANS |
| 38 | LOCAL ATMOSPHERE SENSORS |
| 39 | RF TRANSMITTER |
| 40 | ANTENNA |

The sensor payload 24 comprises a microphone 26 that receives a signal 42 having a peak pulse with a pulse width between 10–40 milliseconds representative of a type of sound blast which is of particular importance to the present invention. The microphone 26 is an omnidirectional acoustic sensor and, in response to the signal 42, provides for an electrical output that is applied on signal path 44 which, in turn, is applied to the bandpass filter 28.

The banddpass filter 28 is selected to transmit a band of frequencies with negligible loss while rejecting all other frequencies. The selected band of frequencies is preferably between 100–2000 Hz. so as to reduce unwanted noise from wind and other sounds which might otherwise tend to degrade the sensing of the characteristics of a typical blast input signal 42. The selected filtering 28 retains the desired timing information contained in signal 42 and provides an output signal that is transmitted along signal path 46 as an input signal to preamplifier 30.

Preamplifier 30 has automatic gain control to maintain a consistent reference across all sensor platforms 24 from which to measure the amplitude of a received signal 42. The output of the preamplifier is transmitted along signal path 50 as the input signal to the level detector 34.

The level detector 34 generates first and second output signals on signal paths 52 and 54, respectively, when the signal on signal path 50, outputted by the preamplifier 30, exceeds a predetermined level. The first output signal on signal path 52 serves to activate the RF transmitter 39 and permit transmission of the presence of the received audio signal to the central command processor 15. The second output signal on signal path 54 is applied to the source discrimination and classification means 36.

Also telemetered by the R.F. transmitter 39 are data from the local atmosphere sensors 38 on board the sensor platform 24. The local atmosphere sensors are known in the art. Local atmosphere sensor data transmitted include atmospheric temperature, barometric pressure, humidity, wind speed, and wind direction.

Also transmitted by the R.F. transmitter 39 are the time of receipt of a received signal 42 and other identifying characteristics of the received signal that have been determined through on board processing by the source discrimination and classification means 36. This information is conveyed via signal line 62 from the source discrimination and classification means 36 on the sensor platform to be further described with reference to FIG. 6.

Time tagging 56 of the acoustic response is generated by the clock reference in the global positioning system 58 known in the art. The global positioning system 58 also generates sensor location information on signal path 60 which is applied to the R.F. transmitter 39. The R.F. transmitter 39 transmits the information 59 to the central command processor 15.

The informational flow of system 10 can be divided into two phases; with phase one (1) determining the initial location of the target of interest T, and phase two (2) related to determining the actual targeting error of the target of interest T. The essential features of phases one (1) and two (2) are given below:

PHASE 1—INITIAL LOCATION (1*a*) (time $t_o$) The muzzle blast occurs from the target of interest T. (The system 10 makes no direct observation at this time).

(1*b*) (time $t_1$, $t_2$ etc.) The sound emitted from the target of interest, T, is detected by the sensors 24 at the platforms A, B, C and D (see FIG. 1).

Figure 2:
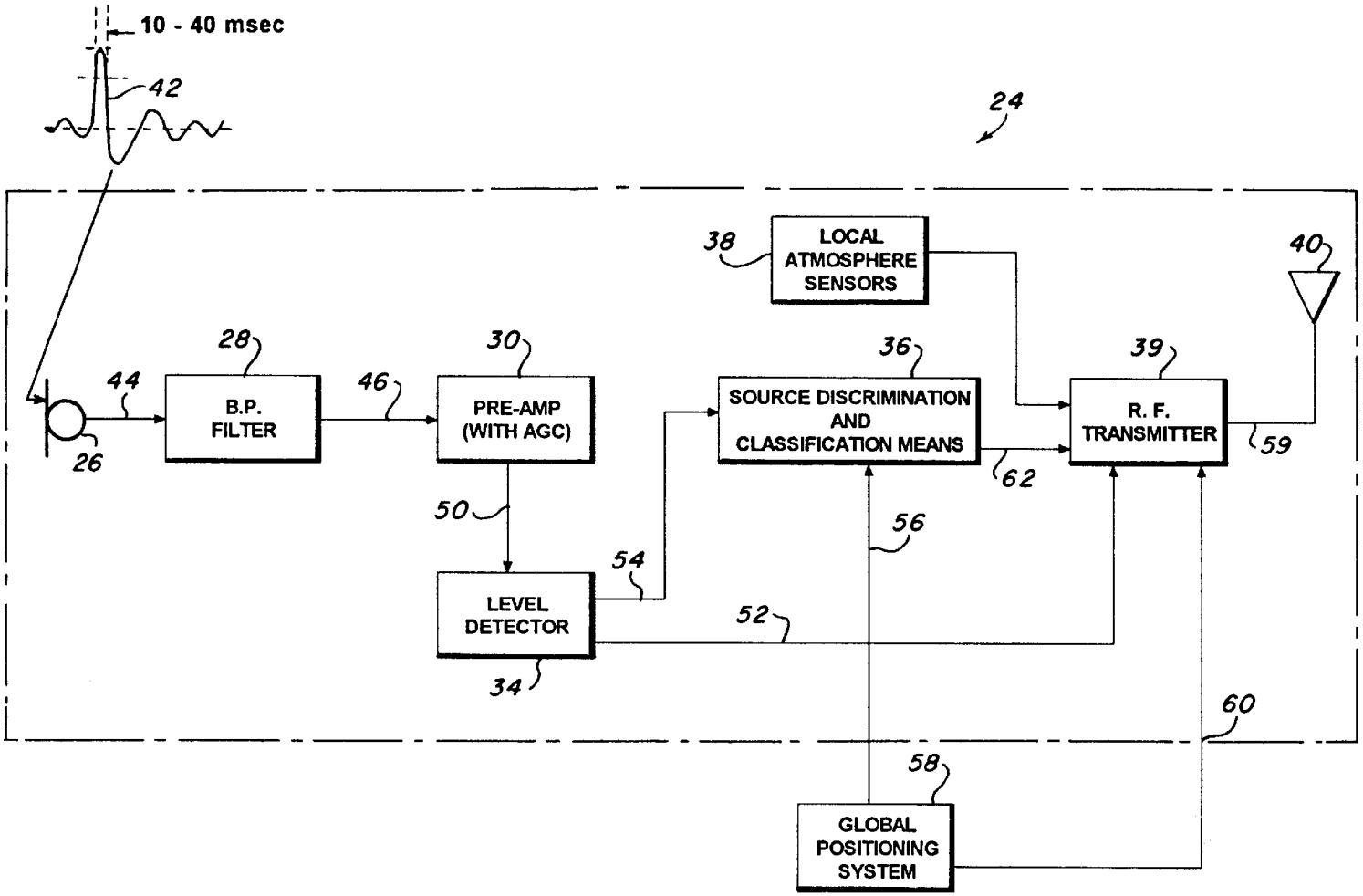
FIG. 2 is a block diagram illustrating the sensors employed in the system of FIG. 1.

(1*c*) The arrival time of the sound blast at each sensor 24 is communicated back to the base station, that is, the central command processor 15 of FIG. 1, by the respective R.F. transmitter 39 (see FIG. 2).

(1*d*) The central command processor 15 acquires inputs from the earliest group of reporting sensors 24 (the sensors closest to the target of interest T), and processes the data to determine the location of the target of interest T.

(1*e*) Under actual conditions, fire is returned to the target of interest T.

PHASE 2—SYSTEM CALIBRATION (SPOTTING)

(2*a*) (time $t_x$), The return shell of (1*e*) above is delivered in close proximity to the target of interest T. (The system 10 makes no direct observation at this time).

(2*b*) (time $t_x$) The impact sound emitted by the shell of (2*a*) above is detected by sensors 24 at the platforms A, B, C and D (see FIG. 1).

(2*c*) The arrival time of (2*b*) at each sensor 24 is communicated back to the central command processor 15.

(2*d*) The central command processor 15 acquires and processes inputs by comparing the arrival times of the shell at each sensor 24 and the original source (that is, of 1(*d*) above) so that the targeting error is accurately calculated. These calculations are then used to re-calibrate the system 10 for the particular field conditions.

(2*e*) If required, a second shell can be delivered to the target of interest T with greatly improved accuracy since the re-calibrated system 10 now includes compensation for trajectory influences and aiming uncertainties.

The determination of the location of the target of interest T may be further described with reference to the Acoustical Model used in the practice of the invention.

ACOUSTICAL MODEL

The task of the system 10 is to relate muzzle noise arrival at each sensor 24 to the location of the target of interest T. For the purposes of first-order acoustic modeling, the system 10 consists of an array of sensors 24 (microphones) located at a sufficient altitude above the field to provide a direct unencumbered acoustic line-of-sight path to the source (muzzle blast) that is, the target of interest T.

Consider first that following the detonation at time $t_o$ an acoustic signal arrives at each sensor 24 indicated with the subscript i. Then the range R to each sensor 24 is simply:

$$R_i = C_i t_i t_i \tag{1}$$

where $R_i$ is the range $c_i$ is the average velocity of sound in air along the acoustical path (typically near 330 m/s)

$t_i$ is the arrival time of the acoustic signal (referenced $tot_o$) at the respective sensor 24.

The actual time of detonation $t_o$ is not needed by the triangulation process performed by the present invention. In this case, the difference in arrival time at a pair of sensors 24 locates the target of interest T along a line. Using three sensors, any two resultant intersecting lines identifies the source location.

Figure 3:
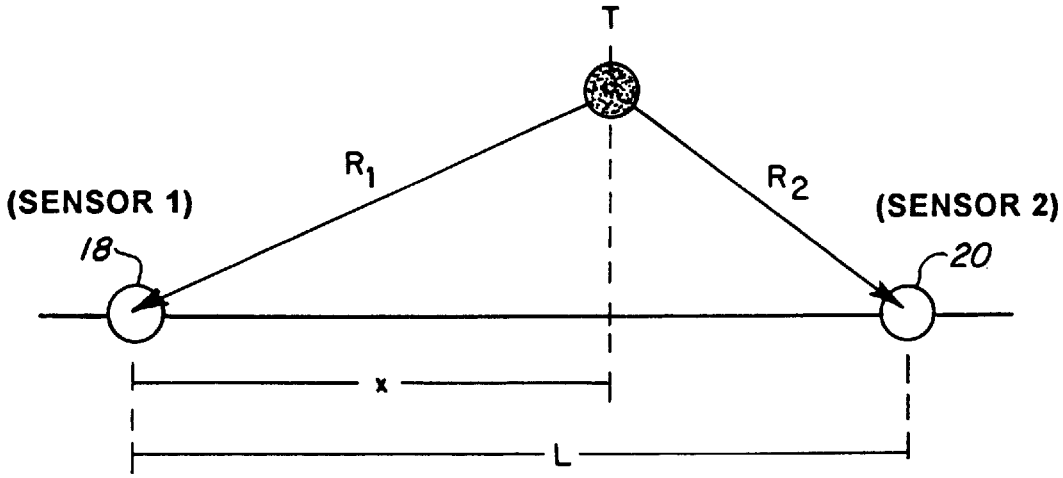
FIG. 3 is a simplified geometry illustration related to the use of two acoustic sensors for performing a triangulation technique of the present invention to locate the source of artillery fire.

With reference to FIG. 3 related to the use of two sensors, consider two sensors (18 and 20) separated by a distance L along the x-axis. When sound is emitted by the source T at location x,y, the sound is detected at the two sensors at times $t_1$ and $t_2$ respectively. The difference in the arrival times at the sensors is given by:

$$\Delta t = t_1 - t_2 = \left(\frac{\sqrt{x^2 + y^2}}{c_1}\right) - \left(\frac{\sqrt{(L-x)^2 + y^2}}{c_2}\right) \tag{2}$$

The algebra for an exact solution for even this case involves a large number of terms. However, if we make simplifying assumption that the sound speeds are equal ($c=c_1=c_2$), we obtain the relation for source (target of interest T)—sensor separation distance as:

$$R_1 = \left(\frac{L-2x}{2}\right)\left(\frac{L}{c\Delta t} - \frac{c\Delta t}{L-2x}\right) \tag{3}$$

Since the range $R_1$ may be expressed as:

$$R_1 = \sqrt{x^2 + y^2} \tag{4}$$

The above expression (3) can alternately be solved to yield y explicitly as a function of x and Δt as:

$$y = \sqrt{\left(\frac{L^2 - 2Lx}{2c\Delta t} - \frac{c\Delta t}{2}\right)^2 - x^2} \tag{5}$$

For a given measured arrival time difference Δt this equation (5) traces a curve of allowable x,y values.

Figure 4:
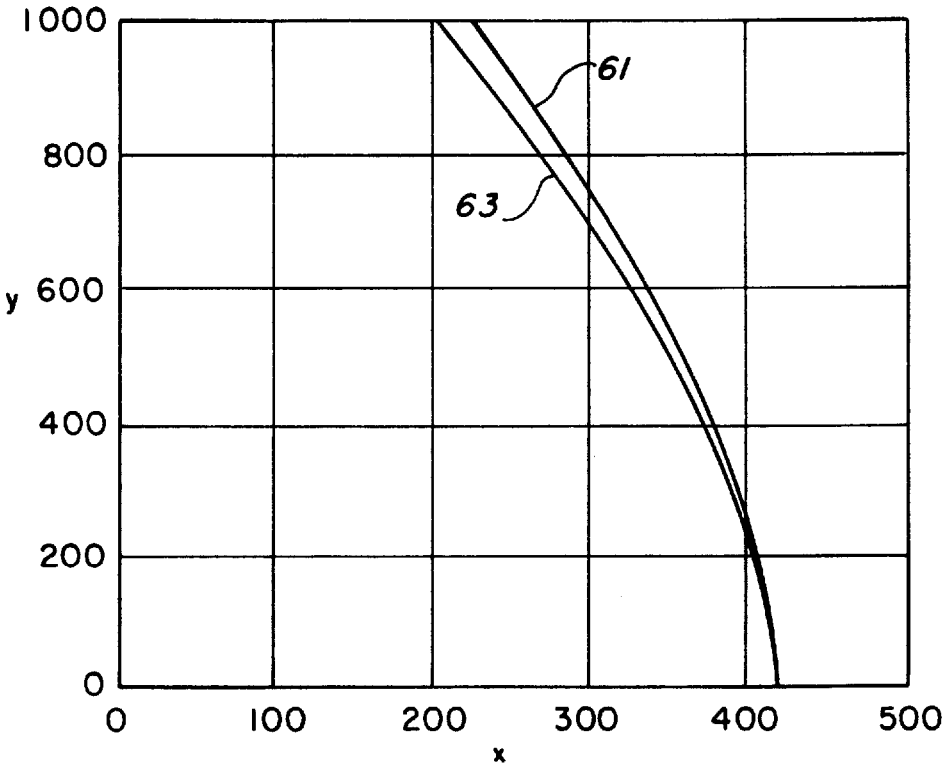
FIG. 4 plots the boundaries of possible source location for the problem illustrated in FIG. 3.

As an example, consider the case where the two sensors 1 and 2 are separated by 1 km, and the measured arrival time difference is 1±0.05 second (this large uncertainty is included for illustrative purposes only), then the source can be located between the two curves 61 and 63 shown in FIG. 4.

Figure 5:
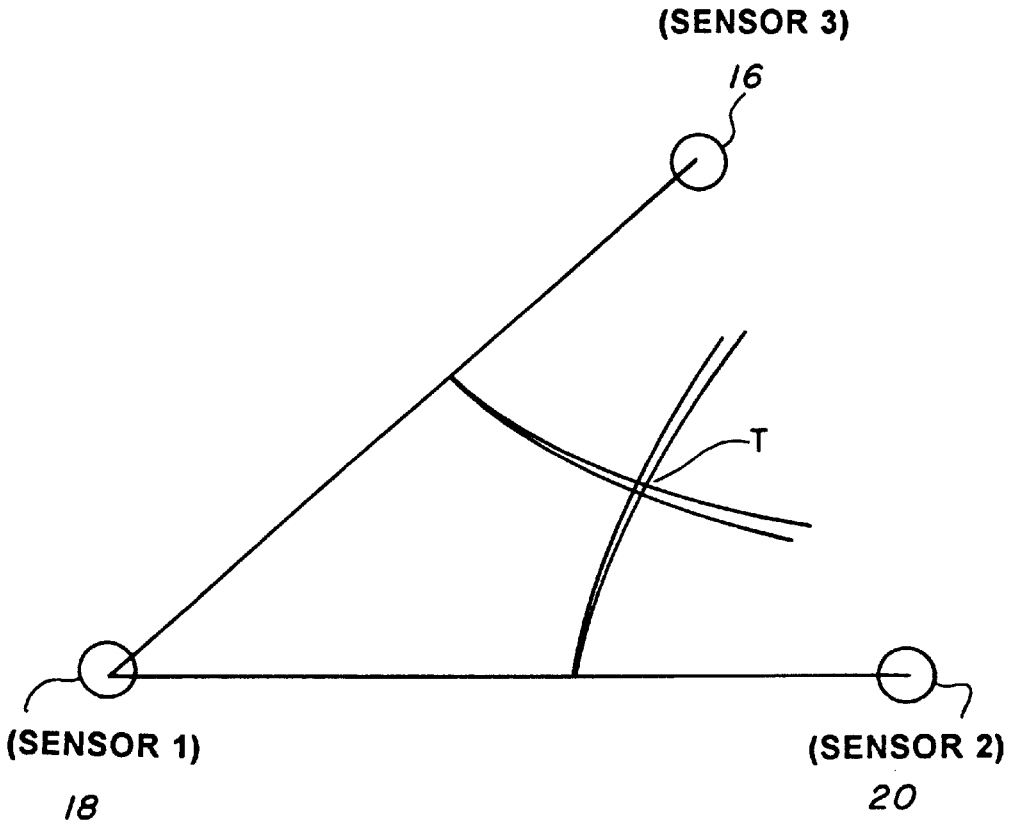
FIG. 5 illustrates how a minimum of three acoustic sensors can be used to pinpoint the location of the source of an enemy gun firing.

Using three sensors the source location can be determined as the intersection of the loci computed from time difference of arrival measurements from any two pair of sensors. This concept is illustrated in FIG. 5.

The source discrimination and classification means 36 previously mentioned with reference to the sensor platform 24 of FIG. 2 may be further described with reference to FIG. 6. Each sensor platform 24 contains an on-board source discrimination and classification means 36 to evaluate a received audio signal on signal path 54 by comparing its characteristics against previously recorded acoustic signatures of enemy weaponry. If a signal of interest on signal path 54 exceeds a threshold number of matching characteristics of an acoustic signature of a known enemy weapon, it must also fail a similar comparison to characteristics of all friendly weapons in the area before a retaliatory strike can be initiated. The acoustic signatures of weaponry belonging to enemy and friendly forces are stored in the database of the source library 63. The signatures may be obtained from field measurement of other reference sources.

Figure 6:
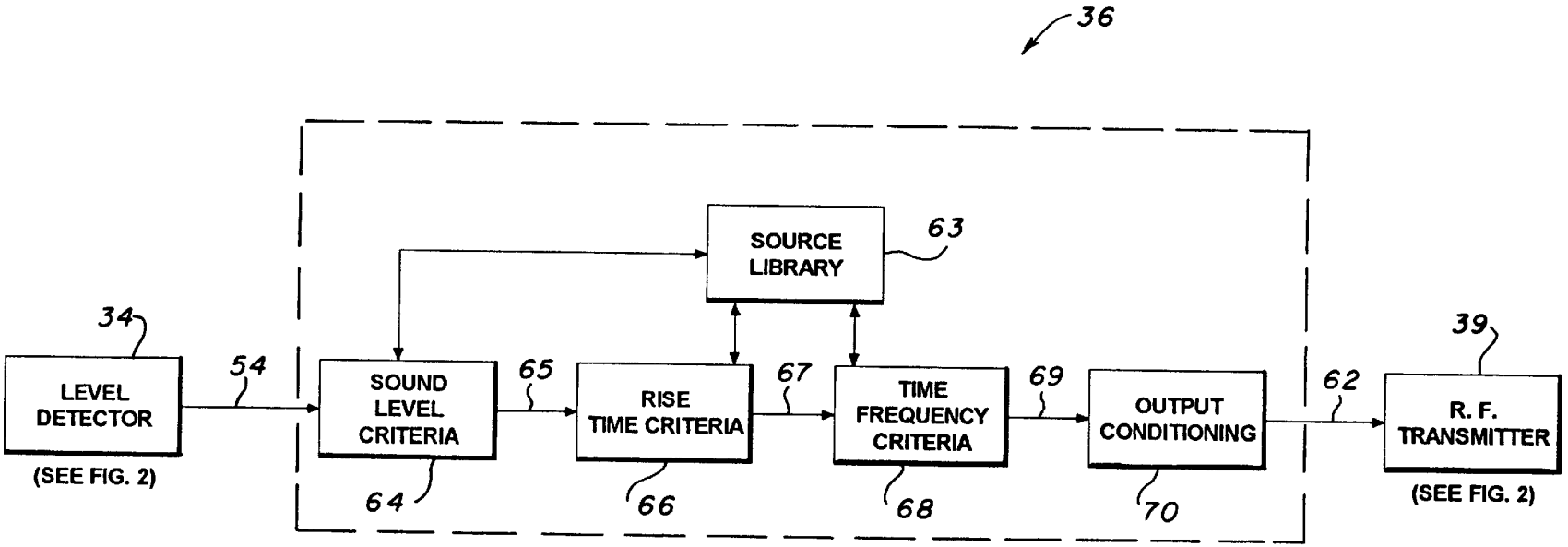
FIG. 6 is a block diagram illustrating the means for source discrimination and classification of received signals.

Source discrimination and classification is performed by evaluating the conditioned signal of interest 54 against waveforms in the source library 63 using successive test criteria of, sound level 64, rise time 66, and time-frequency 68 each comprising a modular configuration and all arranged as shown in FIG. 6.

The sound level criteria module 64 assesses amplitude of received signal above ambient noise level and compares this to expected divergences of weaponry contained in the database. The output of module 64 is applied, via signal path 65, to the rise time criteria module 66.

The rise time criteria module 66 evaluates the initial spike of the received signal and compares this to the known rate of energy release for enemy and friendly weapons characterized in the source library 63.

If a signal of interest on signal path 54 passes both sound level and rise time criteria tests, indicating a potential enemy weapon detection, the signal on signal path 67 is further subjected to a more rigorous test in the time-frequency criteria module 68. In this test the received signal waveform is evaluated in both the time and frequency domains assessing; decay rate, spectra content, waveshape, secondary pulse features, etc., and compared to corresponding characteristics of known weaponry as contained in the database of the source library 63.

A signal of interest on signal path 54 that exceeds a predefined minimum number of matches, including all elements of a mandatory sub-set of requirements, will be classified as the detection of a specific enemy weapon firing. This information contained in the signal on signal path 69 is further processed by the output conditioning module 70 so as to form a reduced data set on signal path 62 for transmission, via the R.F. transmitter 39 of FIG. 2, to the central processor 15 of FIG. 1 for rapid computation of the source location and immediate retaliatory strike against the target.

It should, therefore, readily be understood that many modifications or variations of the present invention are possible within the purview of the claimed invention. It is, therefore, to be understood that, within the scope of the appended claims, the invention may be practiced other than as specifically described.

What I claim is:

1. A system for determining the location from which the sound of a muzzle blast has been transmitted, said system comprising:

(a) an array of elevated sensor platforms having means for detecting signals with characteristic acoustic signatures of known enemy weapons;

(b) a means for determining the instant of occurrence of said sound detection;

(c) means for determining precise location coordinates of said sensor platforms at the instant of receipt of said sound detection;

(d) means for measuring local atmospheric parameters at time of occurrence of said sound detection, and;

(e) means for radio transmission of information collected from on board sensor platforms directly to a base station containing a central command processor that processes said data and performs necessary trigonometric operations to solve for the location coordinates of the source of said signal of interest.

2. The system according to claim 1, wherein said array is one of stationary and mobile elevated sensor platforms.

3. The system according to claim 1, wherein said sensors are elevated by means selected from the group comprising tethered balloons, free-floating balloons, manned aircraft, remotely piloted aircraft, extensible masts on ground vehicles, and ground placed towers.

4. The system according to claim 1, wherein said means for determining precise location is selected from the group comprising precision laser metrology and a global positioning system.

5. The system according to claim 1, wherein said means for determining the instant of occurrence of said sound detection comprises an omnidirectional acoustic sensor.

6. The system according to claim 1, wherein said detected signal is processed to determine if it has signature characteristics that confirm it is from an identifiable enemy weapon, and not from friendly or spurious sources.

7. The system according to claim 1, wherein said central command processor processes time difference of arrival information, sensor locations, time of receipt of signals of interest, local atmospheric conditions, wind speed and direction, and local topography to solve equations to accurately estimate the location of a target of interest.

* * * * *